Patented Dec. 2, 1952

2,620,274

UNITED STATES PATENT OFFICE 2,620,274

NUTRIMENT FOR POULTRY

Dan Lewis, Danville, Ill., and Samuel M. Weisberg, East Islip, N. Y., assignors to Consolidated Products Company, Danville, Ill., a corporation of Nebraska No Drawing. Application August 4, 1950, Serial No. 177,771

16 Claims. (Cl. 99—4)

This invention relates to improvements in poultry feeds. It relates more particularly to the production of turkey and chicken feeds of high nutriment value and improved physical characteristics which render the feed particularly acceptable to poultry.

Satisfactory poultry feeds must be inexpensive and at the same time have a sufficiently high nutrient value to promote rapid growth and resistance to disease. The feed must be palatable to the poultry so that it will be consumed in adequate quantities and should be of such character that the feeding will be accomplished with a minimum of waste. Moreover, the feed should have good keeping qualities and should be easy to handle and use.

In addition to the foregoing, the feed should have such physical properties that it will be attractive and eaten easily by the poultry. It should not be so sticky that particles will be left on the bills, otherwise there will be wastage since such food particles will be wiped off on any convenient surface. Another disadvantage of such "bill sticking" is that other poultry will pick at such particles, oftentimes injuring each other and sometimes resulting in cannibalism.

Available poultry feeds are all lacking in one or more of the above mentioned desirable characteristics or have one or more of the above or other undesirable characteristics. Many feeds, such as cracked grains, are deficient in nutrient value or do not furnish the proper balance required to promote the health of the poultry.

Other products, such as dried whey solids, while adequate from a nutrient standpoint, are tough and brittle so that they are not easily eaten by the poultry.

Still others which are high in nutrient value are liquids or pasty materials which are not readily consumed, or are unpalatable or have a tendency to stick to the bills of the poultry. Generally speaking, presently available poultry feeds leave much to be desired as a complete and acceptable food.

An object of this invention is to provide a poultry feed which has all the properties necessary to render it highly acceptable to poultry, such as chickens and turkeys, and at the same time is a complete food capable of furnishing all of the nutrient factors contributing to the rapid growth and good health of the poultry.

We have found that an emulsion of milk solids, wheat germ solids and water, to which may be added fish liver oils to supply vitamins A and D has all of the components necessary for a complete poultry feed, inasmuch as it contains all of the essential amino acids, vitamin E in the wheat germ solids, and vitamins A, B and D. The emulsion is a well-balanced food enabling poultry to make better use of cereal proteins which are never complete in their amino acid composition. However, this emulsion, alone, is not very suitable as a poultry feed for the reason that it is essentially a liquid and therefore does not have a body similar to natural poultry feeds. It is not practical to dry this emulsion to a more solid body, for then it becomes tough and poultry have difficulty in eating it.

The present invention involves an improved poultry food product and a method of treating the above-described emulsion to impart a satisfactory body to it to render it highly acceptable to poultry.

In accordance with the present invention, we have found that if the emulsion is mixed with an edible gel-forming composition in suitable proportions and then is suitably treated, the resulting composition is a plastic, gel-like material which simulates to a large degree the characteristics of chickens' favorite food, namely, earthworms. In this way, the fowl, in eating the composition, gets much the same sensation as that produced by swallowing an earthworm, which, to a fowl, appears to be the ultimate in gastronomic pleasure. In actual control tests of our new feed, it has been found that acceptability by the fowl is so great that they will tend to overeat the feed. This has the direct advantage of assuring complete consumption of all of the feed supplied to the chickens.

Inasmuch as an emulsion of milk solids, wheat germ, vitamins A and D, and water contains all the essential nutrient factors, the problem was to provide an adequate body to the composition without at the same time rendering it sticky. Also, its consistency should be such that, when the composition is placed in a suitable container, it can be easily picked off by the chickens without too much difficulty. The material should have a consistency which will permit it to descend slowly into the receptacle so that it is all readily available to the chickens and thus can be consumed completely.

As indicated above, typical compositions embodying the invention will contain as their base, an aqueous emulsion consisting essentially of about 25 to 35% milk solids, about 2 to 3% wheat germ solids and the balance principally water. This composition may, in addition, contain a minor proportion of fish liver oil as a source of vitamins A and D, the precise amount of fish liver oil being susceptible of considerable variation but usually is present in an amount between about 1% and 2%.

We have found that any one, or a mixture, of several gel-forming agents, when added in suitable proportions to the emulsion, will impart the necessary body or viscosity to the chicken feed. Such gel-forming agents as starches, preferably potato or pearl starch, cereal flours, such as high gluten flour, soya flour and oat groat flour, corn flour, vegetable gums such as locust bean gum, when present in a proportion of up to 10% (between about 5% and 10% in the case of starches and cereal flour) by weight of the emulsion, are satisfactory for the purpose. In addition to providing the desired body or viscosity to the poultry feed, these components provide nutrient value in themselves.

In preparing the feed, the emulsion or its several components and the gel-forming agent are mixed together with as little agitation as possible and the mixture is heated to a temperature sufficiently high to convert the gel-forming agent into a gel which imparts body to the poultry feed. It has been found that with the above mentioned gel-forming agents, the temperature of the mixture should not exceed about 210° F., preferably within a range of 175 to 210° F., for a period of between about 1 and 20 minutes.

Excessive agitation and excessively high temperatures should be avoided when starch is used as a gel-forming agent, for temperatures above about 200° F. tend to promote hydrolysis of the starch, in which case a gel is not formed.

A typical composition embodying the present invention may be made as follows:

The nutrient emulsion may have the following composition:

*Example No. 1*

35–45 parts whey solids
30–45 parts milk solids { buttermilk / skim milk
10–15 parts delactosed whey solids
2–3 parts wheat germ
1.1 part fish liver oil, etc.
130–190 parts water This emulsion is a fluid composition of relatively low viscosity. The flavor and keeping qualities of the emulsion may be enhanced by culturing the emulsion in the presence of a lactic acid producing organism, such as Lactobacillus bulgaricus. To the above described emulsion is added 8% by weight of pearl starch which is mixed with the emulsion while heating to a temperature of about 190° F. The heating operation should be conducted as quickly as possible in order to avoid the formation of cold pockets in the mixture. Agitation is kept at a minimum commensurate with uniform distribution of the starch throughout the mixture. The heating should be continued for a period of about ten minutes to cause the starch to gel, after which the composition is allowed to cool.

This composition has, when cooled to about room temperature, a consistency which is very much like that of a starch gel containing between about 6 and 10% of starch. In other words, the composition has a jelly-like consistency which is easily deformed by physical means. It will flow slowly at temperatures of 75° F. and above. It is not sticky and detaches easily from a smooth surfaced container so that if packed in a suitable container for feeding the poultry, the material will descend gradually to the bottom of the container as the feed is consumed. The above described composition has a total solids content varying between 38.5% and 43.5%, an acidity of between 3.5% and 5%; a protein content of 7.4% to 10.5% with an average protein content of about 8.6%; fat 2.1% to 2.5%; vitamin A 17,000 to 25,000 U. S. P. units per pound. It also contains vitamins D and E and the vitamins of the B complex and all of the essential amino acids so that it forms, in itself, a complete poultry feed which may be used alone or as a supplement for other feeds.

The feed may be modified substantially, as indicated in the following table which sets forth additional examples of the composition containing the emulsion described in Example No. 1 and the method of preparation, together with a summary of their characteristics:

*Example No. 2*

| Composition and process | Remarks |
|---|---|
| 100 lbs. preheated emulsion. Heated in cooker to 195° F.; held 10 minutes. 9 lbs. pearl starch. | Good product of high viscosity; chicks ate it vigorously, but there was slight sticking to bills. |

*Example No. 3*

| Composition and process | Remarks |
|---|---|
| 100 lbs. preheated emulsion. Heated to 190° F. for 10 minutes. 1 lb. locust bean gum. 5 lbs. potato starch. | Good acceptance by chicks and no bill sticking. |

*Example No. 4*

| Composition and process | Remarks |
|---|---|
| 84 lbs. emulsion. 10 lbs. delactosed whey. 1 lb. 12 oz. locust bean gum. Heated to 200° F. 6 lbs. oat groat flour. | Viscosity less than Example No. 2; good acceptability by chicks—no bill sticking. |

*Example No. 5*

| Composition and process | Remarks |
|---|---|
| 100 lbs. emulsion. 2 lbs. oat groat flour. Heated to 190° F. 3 lbs. pearl starch. | Very good acceptability on chick feeding. |

*Example No. 6*

| Composition and process | Remarks |
|---|---|
| 100 lbs. emulsion. 2 lbs. oat groat flour. Cooked at 190° F. for 12 minutes. 4 lbs. pearl starch. | Excellent body. Very good acceptability by chicks. |

*Example No. 7*

| Composition and process | Remarks |
|---|---|
| 100 lbs. emulsion. 3 lbs. soya flour. Cooked at 190° F. for 12 minutes. 4 lbs. oat groat flour. | Body excellent, good acceptability by chicks; very slight bill sticking. |

Because of the plastic jelly-like body of the composition, it is difficult to measure the viscosity or plasticity of the material with conventional apparatus. However, by utilizing instruments and techniques known in the art for determining plasticity or viscosity, it is possible to express the desired characteristics of the material with reasonable accuracy. Thus, utilizing a Brookfield viscometer equipped with a paddle, operated at a fixed speed, it is possible to calculate the stress-strain characteristics and elastic limit of the composition, in known units. Utilizing, with a Brookfield viscometer, a spindle having a blade .8 mm., in thickness and a rectangular body portion 4.8 mm., wide, and 4.7 mm., high with a triangular extension on the upper edge of the blade having an altitude of 1.5 mm., connected to a spindle 6.5 mm., in length and driving the spindle at 2 R. P. M., the stress characteristics of the composition can be calculated and expressed in dynes per square centimeter and strain in degrees of rotation of the paddle. Testing the material in this way, the preferred composition has stress characteristics at 20° C. between about 75,000 and 120,000 dynes per square centimeter at a strain of about 10° rotation and between 125,000 and 200,000 dynes per square centimeter at a strain of about 40° rotation. Compositions falling below the stress value expressed above are too soft, while compositions having a higher stress value are too tough for fowl to pull a piece readily from the composition.

Utilizing the same apparatus but with the conventional Brookfield scale calibrated in units of 0 to 100, the composition should have an elastic limit in the range between 20 and 40 units at 60° C. and between 65 and 100 units at about 5° C.

Compositions having the plasticity indicated thus are generally self-sustaining when encased in lightweight containers but nevertheless can descend slowly to the bottom of the container to assure complete consumption of the food. They are not so tough that small fowl have difficulty in picking off pieces of the composition so that the composition is highly suitable for feeding fowl of all ages and sizes.

It will be understood that the precise compositon of the feed may be altered considerably as indicated above and that other gel-forming agents may be used if desired. Thus, gelatin, other vegetable gums than locust bean gum, and even such compositions as ethyl cellulose, sodium carboxymethyl cellulose and the like can be used for imparting the necessary body to the composition. Therefore, the embodiments of the invention described above should be considered as illustrative and not as limiting the scope of the following claims.

We claim:

1. A poultry feed comprising finely divided milk solids, a minor proportion of wheat germ, water and an edible gel-forming agent in sufficient amount to impart a plastic, gel-like body to said feed, having stress characteristics at 20° C. between about 75,000 and 120,000 dynes per square centimeter at a strain of about 10° rotation and between 125,000 and 200,000 dynes per square centimeter at a strain of about 40° rotation.

2. A poultry feed comprising about 25 to 35% substantially lactose-free milk solids, about 2 to 3% of wheat germ solids, between about 5% and 10% by weight of at least one edible gel-forming substance of the class consisting of starch and flour, and the remainder principally water, the gel-forming substance imparting a plastic, gel-like body to said feed.

3. A poultry feed comprising about 2 to 3% milled wheat germ, about 25 to 35% milk solids, about 5 to 10% of a mixture of gelatinized starch and a flour of the class consisting of soya flour, oat groat flour, corn flour, and high gluten flour, and the remainder principally water, said starch and flour imparting a plastic, gel-like body to said feed.

4. A poultry feed comprising about 2 to 3% milled wheat germ, about 25 to 35% milk solids, a mixture of gelatinized starch and locust bean gum in an amount up to 10%, and the remainder principally water, said starch and locust bean gum imparting a plastic, gel-like body to said feed, having stress characteristics at 20° C. between about 75,000 and 120,000 dynes per square centimeter at a strain of about 10° rotation and between 125,000 and 200,000 dynes per square centimeter at a strain of about 40° rotation.

5. The poultry feed set forth in claim 1 in which said gel-forming agent consists of gelatinized pearl starch.

6. The poultry feed set forth in claim 1 in which said gel-forming agent consists of gelatinized starch and locust bean gum.

7. The poultry feed set forth in claim 1 in which said gel-forming agent consists of gelatinized pearl starch and flour.

8. The poultry feed set forth in claim 1 in which said gel-forming agent consists of locust bean gum and flour.

9. The poultry feed set forth in claim 1 in which said gel-forming agent consists of soya flour and oat groat flour.

10. The poultry feed set forth in claim 1 in which said gel-forming agent consists of corn flour.

11. A method of preparing a poultry feed comprising agitating a mixture containing about 25% to 35% finely divided milk solids, about 2% to 3% of wheat germ solids, an edible gel-forming agent in an amount up to about 10% and the remainder predominantly water while heating to a temperature between about 175° F. and 210° F. to convert the gel-forming agent to a gel and impart a plastic, gel-like consistency to said mixture.

12. A method of preparing a poultry feed comprising agitating a mixture containing about 25% to 35% finely divided milk solids, about 2% to 3% of wheat germ solids, about 5% to 10% of starch and the remainder predominantly water while heating to a temperature between about 175° F. and 210° F. to convert the gel-forming agent to a gel and impart a plastic, gel-like consistency to said mixture.

13. A method of preparing a poultry feed comprising agitating a mixture containing about 25% to 35% finely divided milk solids, about 2% to 3% of wheat germ solids, starch and locust bean gum in an amount up to about 10% and the remainder predominantly water while heating to a temperature between about 175° F. and 210° F. to convert the gel-forming agent to a gel and impart a plastic, gel-like consistency to said mixture.

14. A method of preparing a poultry feed comprising agitating a mixture containing about 25% to 35% finely divided milk solids, about 2% to 3% of wheat germ solids, about 5% to 10% of starch and flour and the remainder predominantly water while heating to a temperature between about 175° F. and 210° F. to convert the gel-forming agent to a gel and impart a plastic, gel-like consistency to said mixture.

15. A method of preparing a poultry feed comprising agitating a mixture containing about 25% to 35% finely divided milk solids, about 2% to 3% of wheat germ solids, locust bean gum and flour in an amount up to about 10% and the remainder predominantly water while heating to a temperature between about 175° F. and 210° F. to convert the gel-forming agent to a gel and impart a plastic, gel-like consistency to said mixture.

16. A method of preparing a poultry feed comprising agitating a mixture containing about 25% to 35% finely divided milk solids, about 2% to 3% of wheat germ solids, about 5% to 10% of soya flour and oat groat flour and the remainder predominantly water while heating to a temperature between about 175° F. and 210° F. to convert the gel-forming agent to a gel and impart a plastic, gel-like consistency to said mixture.

DAN LEWIS.
SAMUEL M. WEISBERG.

REFERENCES CITED

The following references are of record in the file of this patent:

UNITED STATES PATENTS

| Number | Name | Date |
|---|---|---|
| 148,632 | Tompkins | Mar. 17, 1874 |
| 1,922,919 | Yamamoto | Aug. 15, 1933 |
| 2,504,788 | Baker | Apr. 18, 1950 |

FOREIGN PATENTS

| Number | Country | Date |
|---|---|---|
| 4,450 | Australia | 1926 |